Feb. 5, 1957 T. B. LOFTHEIM 2,780,309
DEVICES FOR REMOVING DUST AND OTHER IMPURITIES FROM AIR, FUNNEL
SMOKE AND OTHER GASES, ESPECIALLY GASES FROM CHEMICAL
AND ELECTROCHEMICAL MANUFACTORIES
Filed June 30, 1952 2 Sheets-Sheet 1
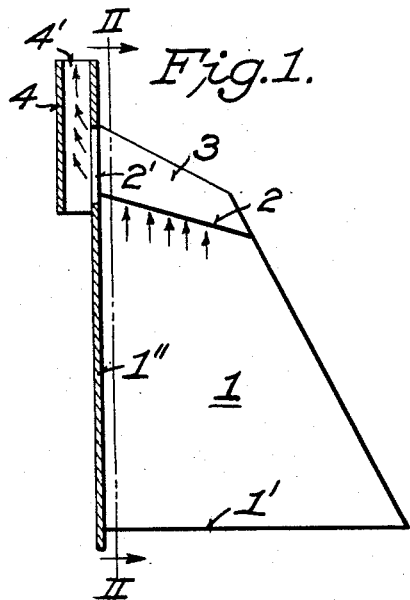
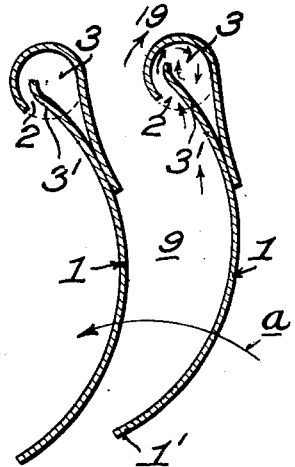
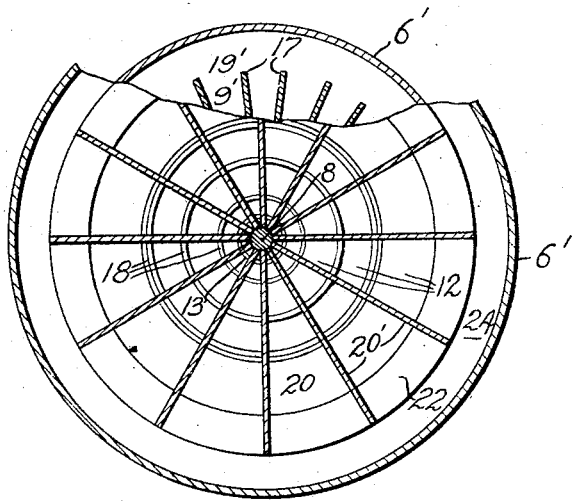
INVENTOR
Tor Björn Loftheim,
BY Sommerso Young
ATTORNEY Feb. 5, 1957 T. B. LOFTHEIM 2,780,309
DEVICES FOR REMOVING DUST AND OTHER IMPURITIES FROM AIR, FUNNEL
SMOKE AND OTHER GASES, ESPECIALLY GASES FROM CHEMICAL
AND ELECTROCHEMICAL MANUFACTORIES
Filed June 30, 1952
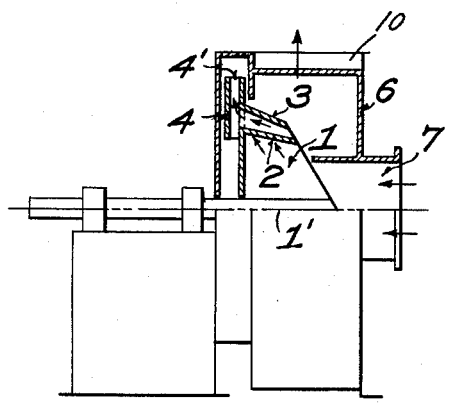
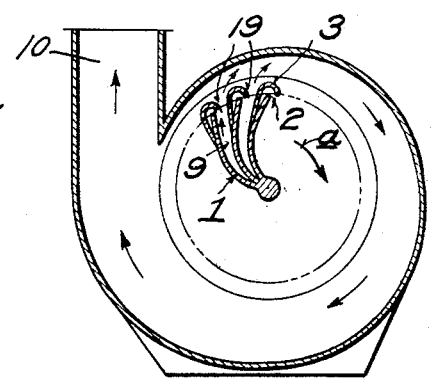
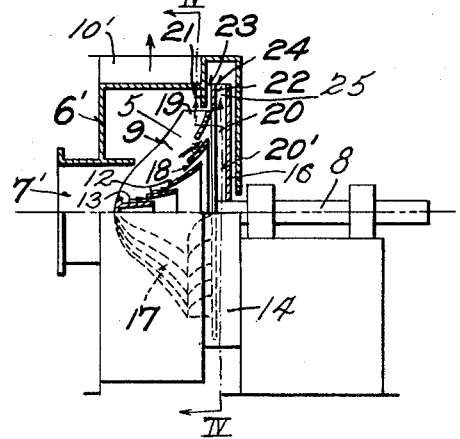
INVENTOR
Tor Björn Loftheim,

United States Patent Office 2,780,309
Patented Feb. 5, 1957

2,780,309

DEVICES FOR REMOVING DUST AND OTHER IMPURITIES FROM AIR, FUNNEL SMOKE AND OTHER GASES, ESPECIALLY GASES FROM CHEMICAL AND ELECTROCHEMICAL MANUFACTORIES

Tor Björn Loftheim, Oslo, Norway

Application June 30, 1952, Serial No. 296,422

Claims priority, application Denmark December 10, 1948

3 Claims. (Cl. 183—77)

This application is a continuation-in-part of abandoned application Serial No. 129,724, filed November 28, 1949.

This invention relates to improvements in apparatus for the removal of dust and other impurities from air, funnel smoke and other gases especially gases from chemical and electro-chemical factories.

Several constructions of rotating devices for effecting this removal were previously known.

In some of the known constructions of apparatus the air or gases are passed through separating channels rotating around the longitudinal axis of the device so that the dust-particles are projected from the gas by the action of centrifugal force.

In a formerly known construction (U. S. Patent 2,317,785), the separation of dust and other solids particles from air or gases, for instance, chimney smoke from chemical or electro-chemical factories, takes place by means of an apparatus, in which the separating member rotates and the separation is effected by whirl-forming separation blades outside the axis of rotation, but in such apparatus a whirling motion causes difficulties in obtaining an effective separation of dust from the air.

According to the present invention the aforementioned difficulties in apparatus of the above kind are avoided by dividing the passage for the dust-bearing gases into a main or primary channel and a supplementary or secondary channel, whereof the primary passage disembogues at the circumference of the apparatus and passes away the substantial quantity of the gases whereas the rest of the gases together with the dust is passed through secondary channels into secondary outlets passing the remaining gases and dust to dust collecting members.

The invention is illustrated by the accompanying drawing in which:

Fig. 1 shows a fragmentary view of a blade of a conical dust separator,

Fig. 1a shows in a somewhat smaller scale this blade placed within its casing.

Fig. 2 shows a transverse section of two successive ones of the blades on the line II—II of Fig. 1.

Fig. 2a shows in a smaller scale these blades placed within their casing.

Fig. 3 shows a modified construction of a dust separator having outlets in accordance with the invention.

Fig. 4 is a sectional view on the section line IV—IV of Fig. 3.

In Fig. 1, 1 denotes a blade of a rotor having its axis of rotation approximately parallel to the line 1', but this axis may also be located at some radial distance inside, this is, lower than, line 1' or in line 1' itself.

From Fig. 1a is seen that the dust-bearing gas is passed by the gas inlet 7 into the apparatus casing 6 on to the blades 1.

Fig. 2 shows a transverse section of two successive ones of these blades 1 rotating in the arrow direction a. The spaces 9 between the blades are in the following termed main or primary passages and 19 are primary outlets for air or gas freed from the substantial dust quantity (and might contain from 4 to 10% of dust).

Numeral 2 refers to narrow slits formed between the bent-over exterior portion of each blade 1 and an extra lip 3' behind which the secondary passage 3 is present. When the blades 1 rotate in the direction indicated by the arrows (Fig. 2a) the air or gas to be cleaned passes from the center indicated by 7, Fig. 1a, outwardly between the blades and is forced outwards through the said passages 9. As mentioned above the larger part of this air or gas passes out of the casing 6 by way of outlet 10 in a substantially cleaned state. The rest, about 16–20%, of the gas together with the separated substantial or bulk quantity of dust, usually 90–96% of the dust, passes out through slits 2 into said secondary passages 3, and from there further out into outlet pipes 4 with outlets proper 4' termed hereinafter secondary outlets. The passages 3 are here in form of closed channels as distinguished from the primary passages 9, which need not be closed channels, nor need they be provided with blades or be divided up peripherically. When air and dust have passed into 3, they can not possibly pass back through the slit 2 but must pass out at 2', 4, and 4', because the air and dust will take the direction of rotation indicated within channels 3 in Fig. 2 and because the outlets 4 act as radial blade members extending to a greater radius than 3 and creating a safe suction effect upon the said air and dust in 3. As shown in Figs. 1 and 1a the passages 3 are in the form of inclined pipes integral with each blade 1 and become somewhat wider towards the opening 2' into pipe 4. Fig. 2 shows that each slit 2 opens tangentially into its pipe 3 on its whole length, whereby gas and dust particles are put into rotation within 3 as mentioned above. In Fig. 1 the pipe 4 is shown as being open below but it may also have a closed bottom.

During the rotation of the rotor whirls would be produced causing regions to wear and reducing the cleaning effect, if special measures were not taken such as the said secondary slits 2, passages 3 and secondary outlets 4.

It is, of course, highly important that dust separated out and passed away through the rotating secondary passages (3, 4 in Figs. 1, 2) is prevented from returning to the primary passages (9 in Fig. 2) where it would contaminate the already cleaned air. Such return is prevented according to this invention by securing in the secondary passages such as closed channels 3 and their prolongation 4, an outwardly directed suction effect which is at least equal to but preferably higher than the suction effect existing in the primary outlets 19. This is obtained safely by arranging the rotating secondary outlets, 4' in Fig. 1, on a radius which is at least as great as the radius at the outlet 19 from the primary passages. The arrangement appears clearly from Figs. 1, 2, 1a and 2a.

In Figs. 3 and 4, numeral 5 denotes a rotor enclosed in the housing 6' having the gas inlet 7'. The rotor 5 is mounted on a rotary shaft 8, and accommodated in housing 6'. The rotor is provided with blades 17 forming between them primary passages 9' and primary outlets 19' for substantially cleaned gas.

The rotor 5 is also provided with a partition means comprising a set of truncated cone-shaped members 12 which set is composed of progressively larger units arranged coaxial with the axis of the rotor with the smallest unit 13 toward the center and to the left in Fig. 3. Each next larger unit has its smaller end slightly spaced from the larger end of the next preceding unit so as to leave a narrow annular slit 18. Each succeeding conical unit has a similar relationship to its next preceding unit so that a series of annular slits 18 is provided of successively larger diameter.

Beyond the blades 17 and plates 12, considered in the direction of movement of the foreign matter being cleaned from the gas there is provided a set of substantially radially arranged secondary blades 20' providing therebetween secondary channels 20, which receive gas and foreign matter from the set of slits 18. The blades 20' extend outwardly from the shaft 8 which closes the inner ends of the interspaces 20, and a disk 16 extends radially outwardly from shaft 8 adjacent the edges of blades 20' opposite cone shaped members 12. The radial length or extent of blades 20' is greater than that of blades 17, so that the centrifugal force exerted by blades 20' is greater than that exerted by blades 17 and thus the force exerted by blades 20' is responsible for causing part of the flow of gas through the cleaner and provides for discharge of the separated solid matter to the solid matter receiving chamber 14 of the casing. Numeral 21 denotes a radial wall forming part of the stationary housing 6' outside the rotor. The gas to be cleaned passes through inlet 7', between the blades 17 into the primary passages 9' and outwards within same owing to the centrifugal force. The greater quantity of the gas is thereby passed in a substantially cleaned state out from the rotor through the primary outlets at 19 and thence to the casing outlet 10'. The rest of the gases pass through the slits 18 into the secondary passages 20, containing the blades 20', by which the rest of said gases together with the greater quantity of the separated dust is forced outwardly to the periphery and out at the secondary outlet edges 24.

Because of the blades 20' the rotating secondary passages 20 are in the form of separated or closed channels or ducts which have their outlets ending at 24. Of course these passages 20' need not be separate ducts through their whole radial length. It is important, however, that their exterior portion 25 is in the form of closed channels or ducts adapted to exert a sharp centrifugal force upon the concentrated dust-bearing air. The periphery of wall 21 is arranged at a certain radial distance from the periphery of the rotary wall 22, so that between 21 and 22 a narrow annular space 23 is formed which prevents separated dust passing out at the secondary outlet edge 24 from returning to the primary outlets 19, because 24 is arranged on a diameter at least as great as that of the outlets 19, so as to create in the same manner as mentioned in connection with Fig. 1 a suction effect at least as high as that in the passages 9 at 19.

An especially favourable effect is obtained by arranging the conical plates 12 which form slits 18 along a curve diverging from the inlet part towards the outlets 19.

It will be understood that the constructions shown in the drawings are only examples for illustrating embodiments of the invention and that the details may be modified without departing from the scope of the claims.

I claim:

1. A rotary apparatus for separating solid particles from gas comprising a stationary casing, a rotor in said casing having a set of radially extending primary blades angularly spaced apart and forming between them primary passages and primary outlets from said primary passages for purified gas at the periphery of said rotor, a second set of substantially radially arranged blades forming secondary passages rotating with said first-mentioned blades, partition means between said primary and secondary blades and passages provided with narrow slits connecting said primary passages with said corresponding rotating secondary passages and through which part of the gas and a large part of the solid particles to be separated pass into said secondary passages by a force created by said secondary blades and acting against the centrifugal force of said primary blades, means forming a rotating secondary outlet communicating with said secondary passages, said secondary outlet forming means having an exterior edge arranged rotatably on said rotor between each of said secondary blades and its adjacent blades at a diameter at least equal to that of the periphery of said rotating primary outlets.

2. Apparatus according to claim 1, and in which a rotary plate is provided extending adjacent to said secondary outlets arranged radially outwardly from and encircling the exterior portions of all said primary outlets, a stationary radially disposed plate spaced from said rotatable plate and encircling said primary outlets more distant from said secondary outlets than said rotating plate, so that between said two radial plates an outwardly extending annular space is defined which constitutes an exterior continuation of portions of the outer ends of said primary outlets and prevents solid particles from said secondary outlets from returning inwardly to the portions of said primary outlets through which most of the purified gas passes away from the apparatus.

3. Apparatus according to claim 1 and in which said narrow slits in said partition means between said primary and secondary blades are arranged at progressively greater distances from the axis of rotation of said rotor.

References Cited in the file of this patent

UNITED STATES PATENTS

| 1,785,918 | Stebbins | Dec. 23, 1930 |
| 1,941,449 | Sylvan | Jan. 2, 1934 |
| 2,039,127 | Sylvan | Apr. 28, 1936 |
| 2,209,607 | Nutting | July 30, 1940 |
| 2,317,785 | Loftheim | Apr. 27, 1943 |
| 2,482,642 | Sylvan | Sept. 20, 1949 |

FOREIGN PATENTS

| 101,419 | Sweden | Apr. 22, 1941 |
| 645,477 | France | June 27, 1928 |
| 802,652 | France | June 13, 1936 |